(12) United States Patent
Fahs et al.

(10) Patent No.: US 7,033,161 B2
(45) Date of Patent: *Apr. 25, 2006

(54) ROLLER MANIFOLD FOR FORMING A CONTINUOUS SHEET OF VISCOUS MATERIAL

(75) Inventors: Kenneth R. Fahs, Green Bay, WI (US); Franco X. Milani, Green Bay, WI (US); Shawn L. Owens, Joplin, MO (US)

(73) Assignee: Schreiber Foods, Inc., Green Bay, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/805,937

(22) Filed: Mar. 22, 2004

(65) Prior Publication Data

US 2004/0173936 A1    Sep. 9, 2004

Related U.S. Application Data (63) Continuation of application No. 09/481,451, filed on Jan. 11, 2000, now Pat. No. 6,797,306.

(60) Provisional application No. 60/125,195, filed on Mar. 18, 1999.

(51) Int. Cl.
*A23P 1/10* (2006.01)
*B29C 39/14* (2006.01)

(52) U.S. Cl. .............. 425/373; 426/512; 426/516; 426/517; 425/447

(58) Field of Classification Search .......... 426/512, 426/513, 515, 516, 517, 582; 425/373, 447; 264/212; 99/455, 464
See application file for complete search history.

(56) References Cited

U.S. PATENT DOCUMENTS

| | | | |
|---|---|---|---|
| 2,813,033 A | 11/1957 | Schneider | |
| 3,576,051 A | 4/1971 | Click et al. | |
| 3,801,255 A | * 4/1974 | Meyer et al. | ............... 425/147 |
| 3,900,574 A | 8/1975 | Warwick | |
| 4,061,794 A | 12/1977 | Charles | |
| 4,083,912 A | 4/1978 | Platte et al. | |
| 4,139,646 A | 2/1979 | Gastrock | |
| 4,293,290 A | 10/1981 | Swanson | |

(Continued)

FOREIGN PATENT DOCUMENTS

JP    59133    4/1984

OTHER PUBLICATIONS

Perry's Chemical Engineers' Handbook, 1997, 7th Ed., pp. 10-34 & 10-35.

*Primary Examiner*—James P. Mackey
*Assistant Examiner*—Thu Khanh T. Nguyen
(74) *Attorney, Agent, or Firm*—Brinks Hofer Gilson & Lione (57) ABSTRACT

The present invention is directed to a method and apparatus for forming a continuous sheet of a molten material with particularly viscous, sticky properties. This molten material may be moldable, plasticized or a food product such as cheese. More specifically, the invention includes a manifold that discharges the molten material in a continuous layer upon the surface of a casting belt. This manifold comprises a roller, a chamber with a hollow interior, at least one inlet and a drive mechanism.

22 Claims, 7 Drawing Sheets

U.S. PATENT DOCUMENTS

| | | |
|---|---|---|
| 4,302,478 A | 11/1981 | Hamann et al. |
| 4,790,242 A | 12/1988 | Driessen |
| 4,815,368 A | 3/1989 | Nelles |
| 4,815,370 A | 3/1989 | Collins |
| 4,879,946 A | 11/1989 | Blodgett et al. |
| 4,976,981 A | 12/1990 | Skovhage et al. |
| 5,480,666 A | 1/1996 | Lindgren |
| 5,494,622 A * | 2/1996 | Heath et al. ............... 425/80.1 |
| 5,527,551 A | 6/1996 | Fager et al. |
| 5,573,805 A | 11/1996 | Fager et al. |
| 5,863,566 A | 1/1999 | Wood et al. |

* cited by examiner

ROLLER MANIFOLD FOR FORMING A CONTINUOUS SHEET OF VISCOUS MATERIAL

BACKGROUND OF THE INVENTION

This applicant is a continuation of U.S. patent application Ser. No. 09/481,451 filed Jan. 11, 2000, now U.S. Pat. No. 6,797,306, which claims, under 35 U.S.C. §119(e), the benefit of priority of the filing of Mar. 18, 1999 of U.S. Provisional Patent Application filed on the aforementioned date having the title "Roller Manifold For Forming A Continuous Sheet Of Viscous Material" listing Kenneth R. Fahs, Franco X. Milani, and Shawn L. Owens as inventors and having Ser. No. 60/125,195, the entire contents of which are incorporated herein by reference.

The present invention is directed to a method and apparatus for forming a continuous sheet of a molten material with particularly viscous, sticky properties. This molten material may be moldable, plasticized or a food product such as cheese. More specifically, the invention includes a manifold that discharges the molten material in a continuous layer upon the surface of a casting belt. This manifold comprises a roller, a hollow chamber with at least one open side and at least one inlet into the chamber.

Material such as processed cheese products present some difficulties in cutting or slicing because such material tends to cling to the cutting surfaces. For this reason, a process was developed in which such a material is melted and extruded into a thin sheet upon a surface such as a moving belt. In such a process, molten cheese is fed into a manifold, which distributes the molten cheese in a layer onto a continuously moving endless belt, which is commonly called a casting belt. Such a process, and the apparatus used in such a process, is described, for example, in U.S. Pat. Nos. 5,527,551 and 5,573,805, the entire content of which are incorporated herein by reference., A standard manifold that may be used in such a process is also described, for example, in U.S. Pat. No. 4,790,242. In prior art manifolds, cheese is distributed from the manifold onto the casting belt. A fixed bar known as a "nose bar" forms part of the manifold. The manifold distributes the cheese onto the casting belt between the nose bar and the surface of the casting belt (i.e., the space between the nose bar and the surface of the casting belt defines the thickness of the layer or film of cheese). Pressure is provided, through suitable pumps, to force the cheese to extrude between the surface of the belt and the nose bar. Since the casting belt is moving, the cheese is carried downstream of the nose bar on the surface of the casting belt thereby forming a continuously moving sheet of cheese. The sheet of cheese is further processed downstream in a manner known in the art. A standard manifold is divided into an upper and lower compartment and may even be further divided into a number of compartments in order to distribute evenly the pressure building up from the material coursing through the manifold. The manifold of the present invention, however, requires only one interior space, although additional compartments are not precluded from the invention.

Materials such as processed cheese products are now being created with more "extreme" textures. These "extreme" textures tend to be stickier and more viscous than other types of cheese. Because of this stickiness, it becomes more difficult to form a continuous sheet of material using the process and apparatus described in the prior art since the stickier material clogs the chambers of prior art manifolds and tends to tear while extruding onto the casting belt from a "nose bar" or other such standard manifold. The viscosity also affects the processing because more viscous materials tend to tear as they exit from the nose bar.

Viscosity is a measurement of the flow properties of a product. Viscosity can be defined as the ratio of the "shear force" applied to a material and the amount that the material is "deformed" by this force. The deformation of the material is expressed as the "rate of shear". Therefore, viscosity is the relationship between shearing stress and rate of shear. Viscosity is temperature dependent and typically decreases as the temperature rises.

TABLE 1 below lists some common fluids and their viscosities, in addition to the viscosities of some of the products that could be processed using the method and apparatus of the current invention.

TABLE 1

| FLUID | CP at 0° C. | CP at 20° C. | CP at 30° C. |
|---|---|---|---|
| water | 1.79 | 1.00 | |
| Milk, whole | 4.28 | 2.12 | |
| Sucrose solution (60%) | | 60.2 | |
| Molasses | | 6600 | |
| Olive oil | | | 84.0 |
| Soybean oil | | | 40.6 |

Therefore, a number of characteristics are desirable for a manifold dispensing such sticky or viscous material. Such a manifold must have a capability for receiving the starting material under pressure and distributing it evenly along the full length of the manifold and upon the casting belt. This distribution must be accomplished continuously to accommodate the high rate at which the material flows through the manifold. The manifold must facilitate distribution of the material in such a way that the material forms continuous sheets and does not tear as it is being deposited on the belt. The manifold should be easily assembled and disassembled for cleaning purposes. Finally, it would be advantageous if the manifold were interchangeable with a standard/prior art manifold (or other suitable manifold) so that more than one variety of manifold could be used with the same casting line and more than one variety of starting material could be processed.

The process by which such sticky, viscous starting material flows through the manifold should also accommodate the stickiness of the material. The material should flow through the manifold in such a manner and at a rate that is suitable for commercial processing and such that the manifold is not clogged.

Therefore, in view of the above, it is an object of the present invention to provide an apparatus and method which efficiently forms a continuous sheet of material from such a sticky or viscous starting material.

Another object of the present invention is to provide a manifold that accommodates such viscous starting material with minimal clogging and tearing.

SUMMARY OF THE INVENTION

The present invention provides a method and apparatus for forming a continuous sheet from a molten, viscous starting material, such as cheese. The invention may also be used to form other such moldable materials such as plastic.

More specifically, the invention includes a manifold, which discharges the starting material upon a surface, such as a casting belt. The manifold comprises a chamber with a hollow interior which receives the material, at least one inlet for feeding the material into the manifold and a roller which discharges the starting material upon a surface, such as a casting belt. The roller cooperates with the surface on which the material is distributed on in order to extrude the material in a smooth manner.

The manifold of the present invention is preferably mounted above the casting belt. The manifold is situated in such a way that the belt freely revolves underneath the manifold and the roller of the manifold freely revolves above the belt. A layer of material is formed between the belt and the roller.

A viscous sticky product run through the manifold of the present invention does not react as violently to pressure as in a standard manifold and therefore pressure is more constant as the material flows through the manifold.

In a preferred embodiment, the manifold of the present invention has top and bottom face plates, two end plates and upstream and downstream face plates; these face plates together form a chamber with a hollow interior. The bottom face is open to the casting belt along at least a part of its length. The downstream face is open to the roller along at least a part of its length.

The present invention, as well as the preferred embodiment thereof, will best be understood in view of the appended drawings, a brief description of which follows.

DETAILED DESCRIPTION OF THE INVENTION

Figure 1:
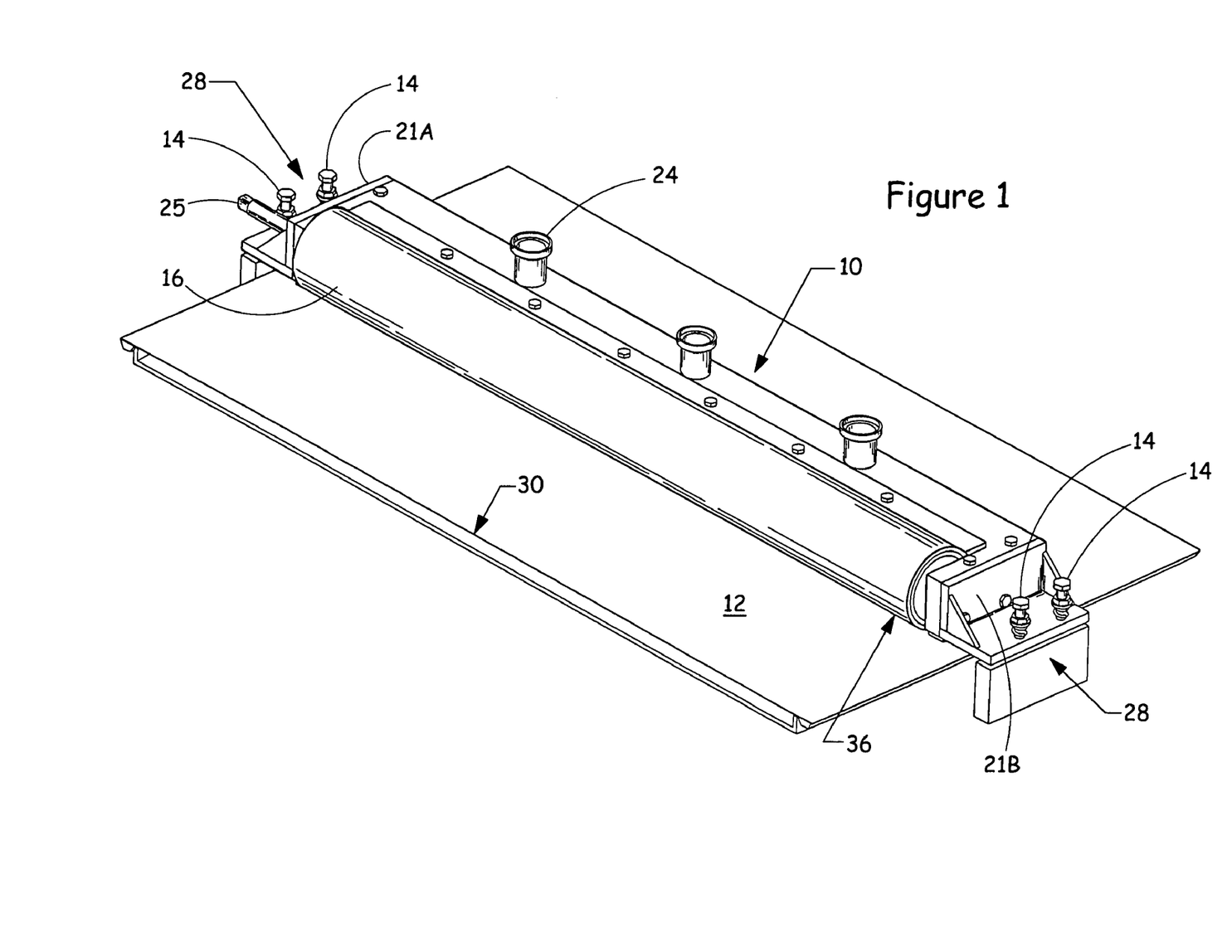
FIG. 1 is a perspective view of the preferred embodiment of the roller manifold of the present invention.

Referring now to the drawings, FIG. 1 shows a perspective view of a preferred embodiment of the discharge roller manifold 11 of the present invention. The manifold 11 comprises a chamber 10 that is disposed adjacent to a roller 16.

Figure 6:
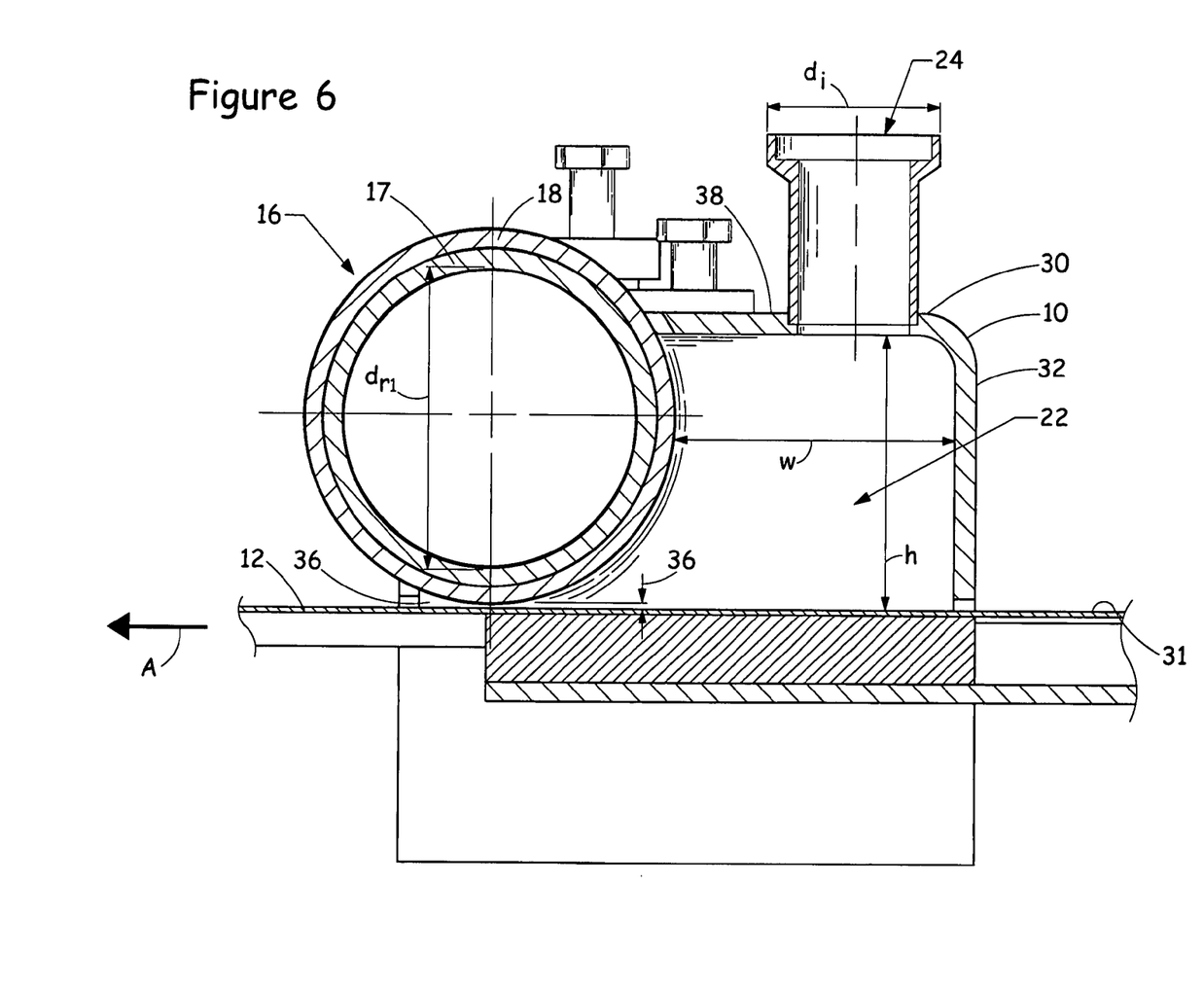
FIG. 6 is a cross-sectional view of the interior of the roller manifold of FIG. 2.
Figure 7:
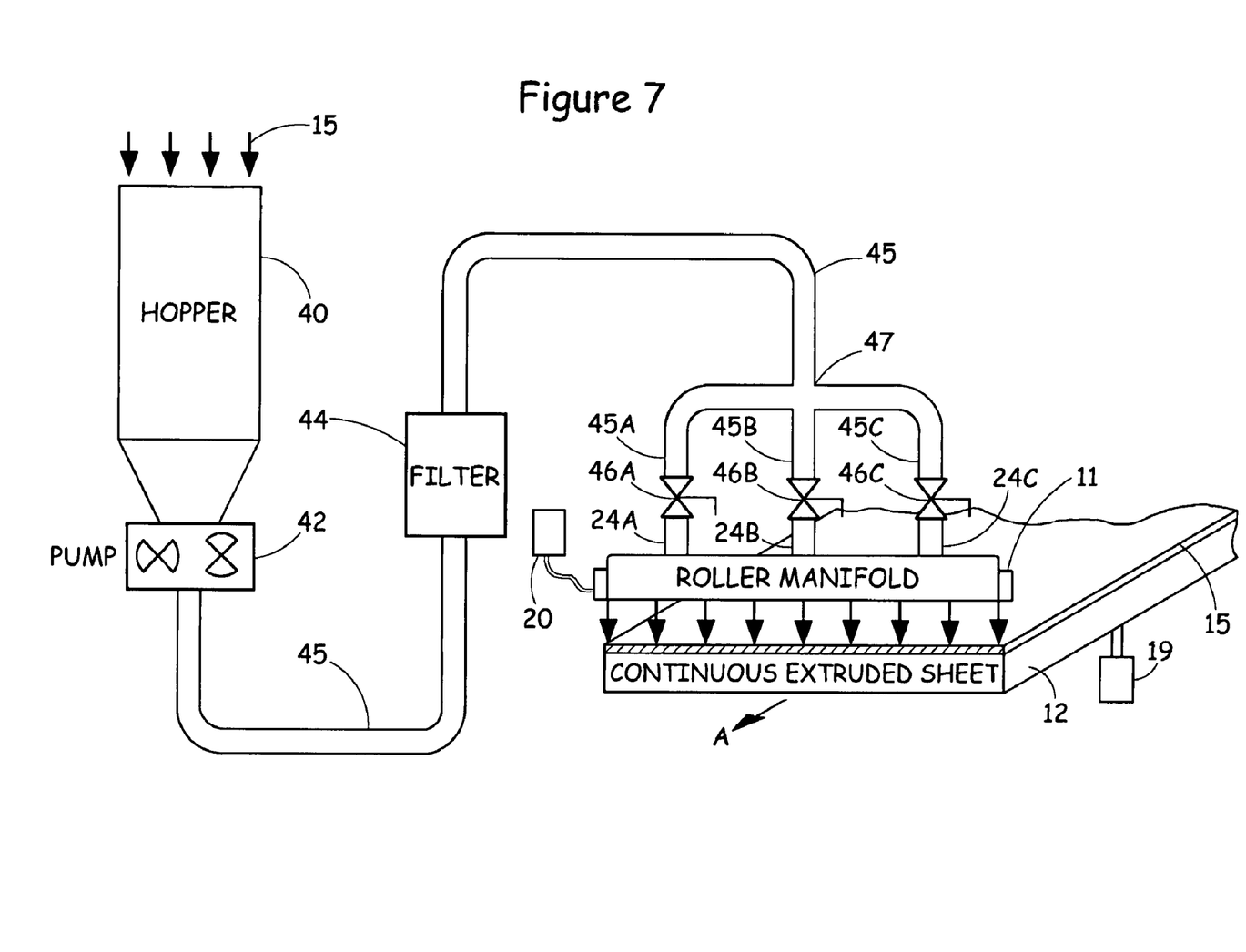
FIG. 7 is a diagram illustrating the general flow of a sheet forming apparatus that incorporates the roller manifold.

As seen in FIGS. 1–7, and in particular FIG. 7, the material 15 to be processed is fed into a hopper 40 from a conventional source, such as a cooker or heating device (not shown). In the presently preferred embodiment for cheese material 15 comprises a cheese mass which is fed into the hopper from a cooker at a range of 20–40° C. to about 80–100° C. at standard atmospheric pressure. The material 15 may be fed to the hopper 40 for holding or the material 15 may be further processed in the hopper, for example, by mixing in additional materials. The material 15 is then pumped into a line 45 by a pump 42. A suitable pump for processing cheese is a typical APV model 3 or model 6 pump, which is commercially available. In the embodiment used for cheese, the pump 42 provides a pressure of up to 150 psi for the cheese exiting the pump into line 45. The material then flows into a filter 44, which is used to filter foreign objects out of the material 15. A suitable filter may be, for example, a Tn-Clover nylon mesh filter SN2 with a mesh of 30, which is commercially available. After the material 15 exits the filter 44 it continues through the line 45 until reaching a juncture 47 where the pipe distributes the material into three different legs or pipe segments, 45A, 45B, and 45C. It will of course, be recognized by those skilled in the art, that the line 45 may be split into fewer or more legs depending on the particular use contemplated. Each of the legs 45A, 45B, and 45C then feeds into a respective manifold inlet 24A, 24B, and 24C. Preferably, a valve 46A, 46B and 46C is disposed between each of the legs 45A 45C and each of the inlets 24A 24C. A suitable valve is an adjustable valve, such as one commercially available from Lumaco's butterfly valve series, Model No. LUD-7. The manifold 11 receives the material 15 through the inlets 24A 24C and distributes the material, such as cheese material, in an even layer 15 which is deposited onto a casting belt 12 in a manner described more fully below. A first drive mechanism 19 (shown schematically) is used to drive the endless belt 12 at an appropriate rate of speed such as 5–15 ft/mm to about 50–70 ft/mm.

FIGS. 1–6 show a manifold 11 mounted over the casting belt 12 upon which the material 15 being processed is extruded in a presently used embodiment. A drive mechanism 20 that causes the casting belt to revolve is shown schematically in FIG. 7.

The manifold 11 of FIG. 1 is mounted in mounting areas 28, located to one or both sides of casting belt 12. Standard bolts 14 or other such suitable mounting devices are used to attach the manifold in these mounting areas. The manifold 11 is thus disposed above the casting belt 12 so that the roller 16 can roll freely in the same direction as the casting belt. A space 36 is formed between the roller 16 of the manifold 11 and the belt 12. Material, such as cheese, is extruded through this gap 36.

Figure 2:
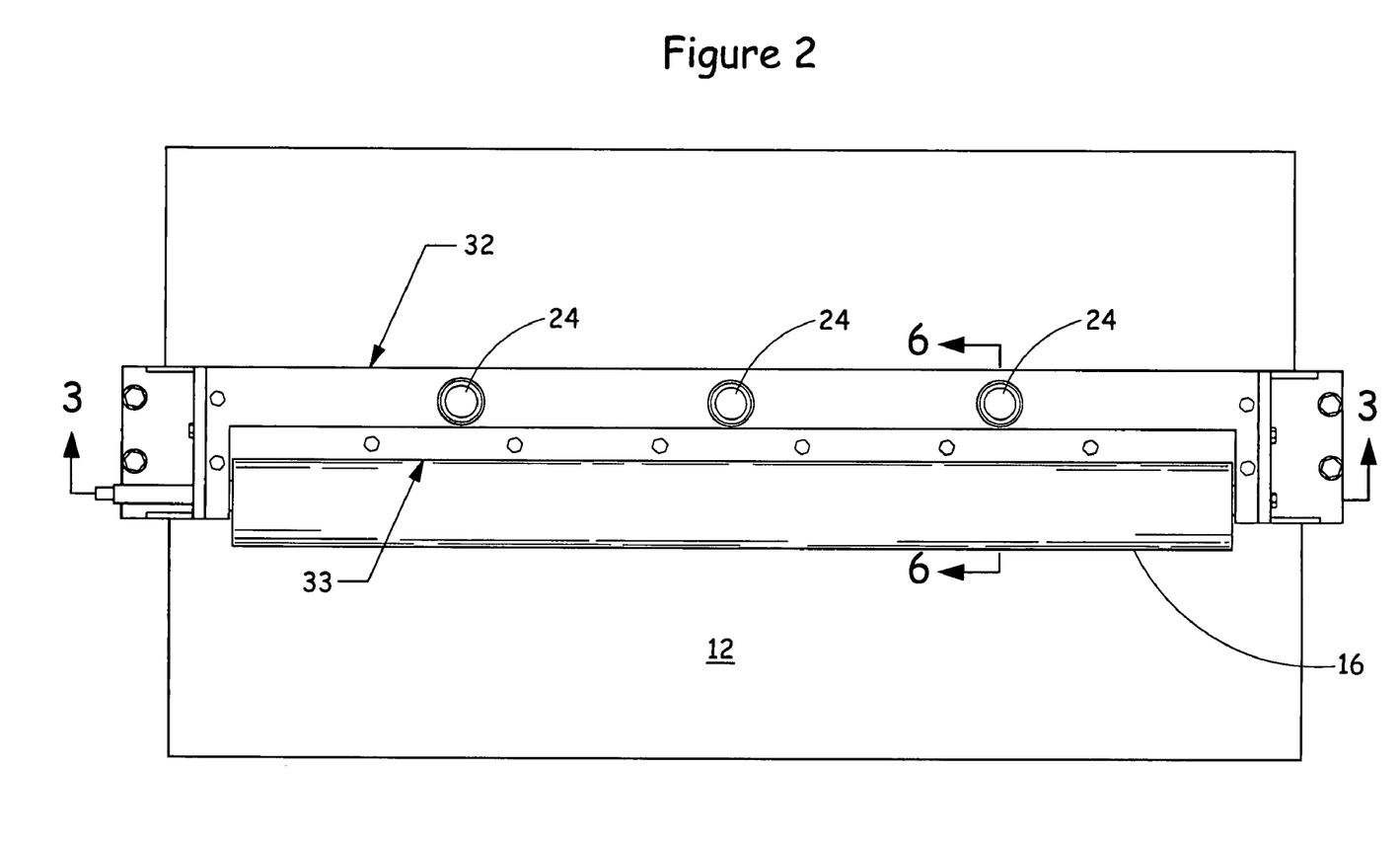
FIG. 2 is a top view of the roller manifold of FIG. 1.
Figure 3:
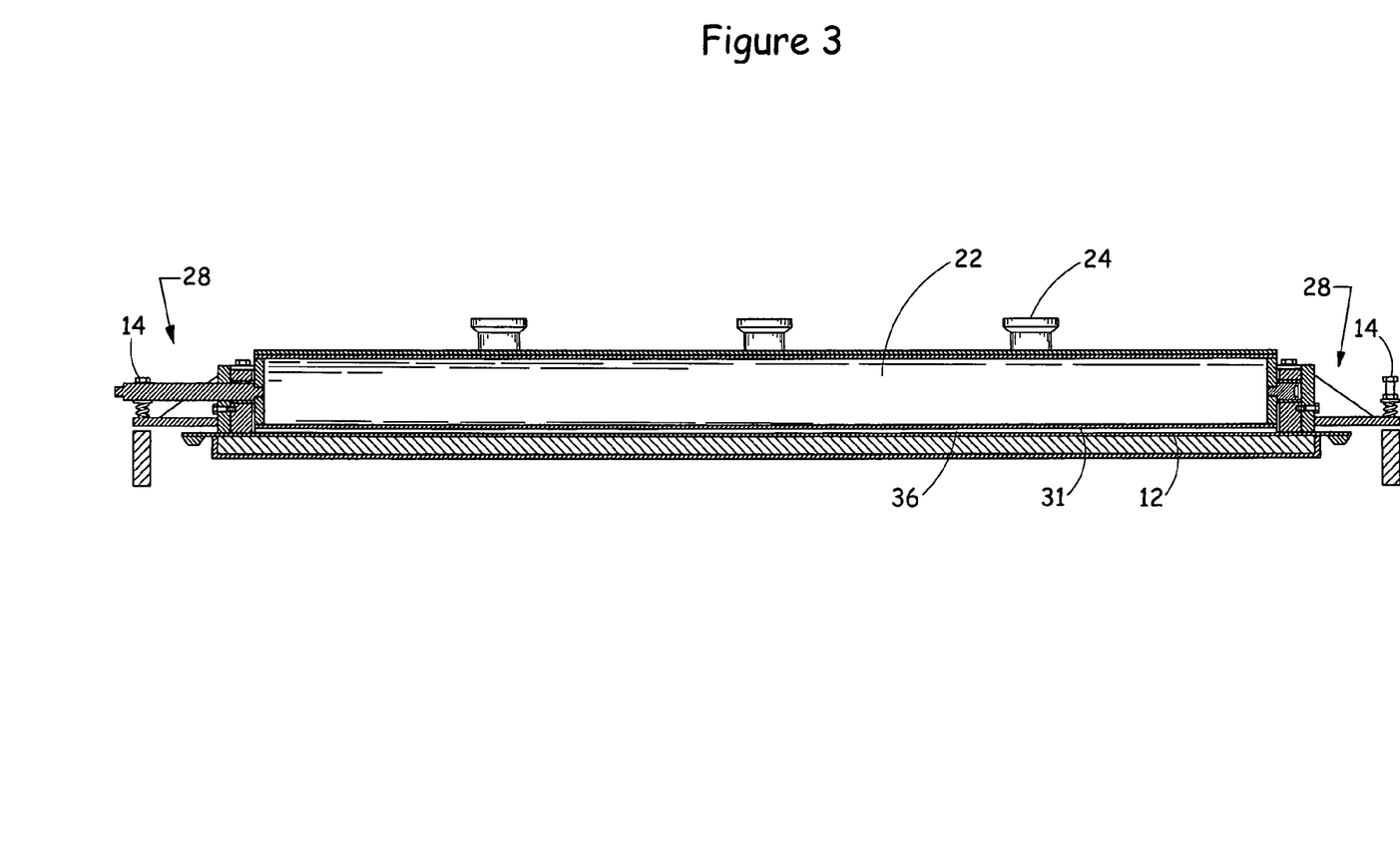
FIG. 3 is a cross-sectional view of the interior of the roller manifold of FIG. 2.
Figure 4:
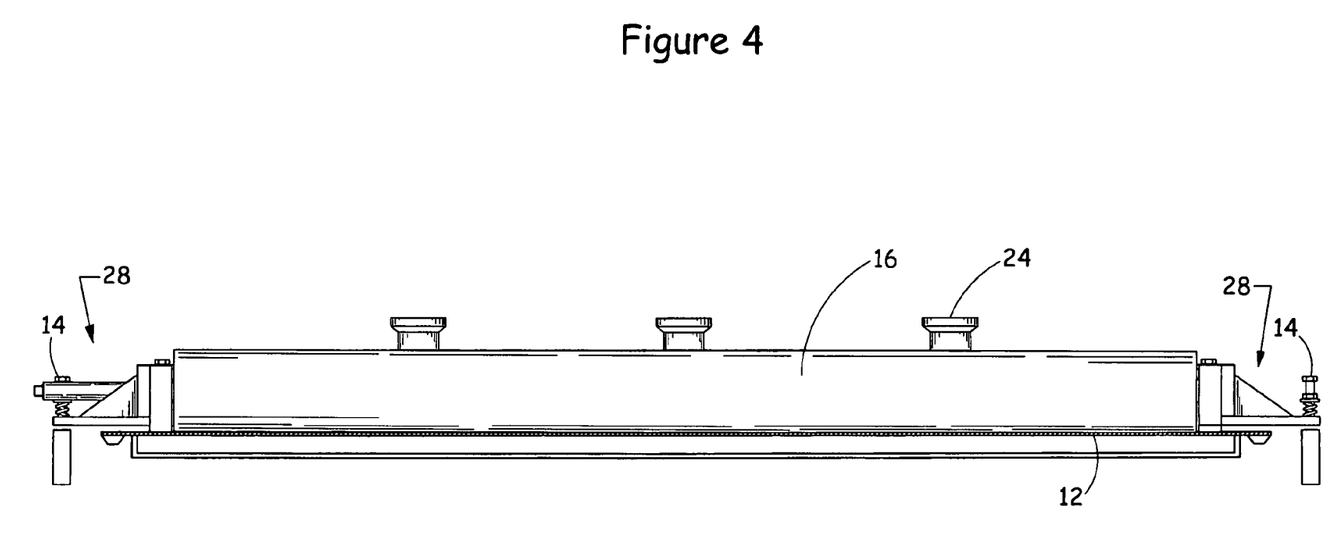
FIG. 4 is a face view of the roller manifold of FIG. 1.
Figure 5:
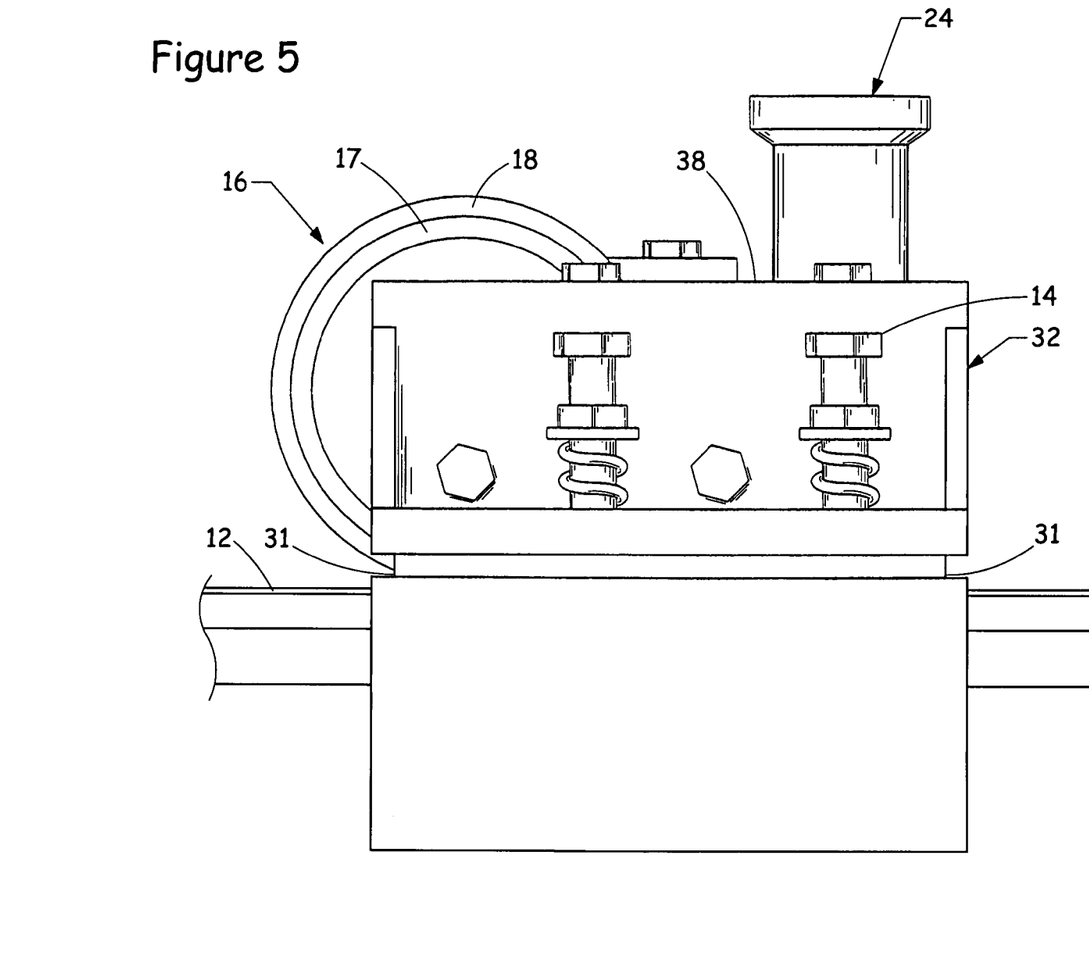
FIG. 5 is a side perspective view of the roller of the manifold of FIG. 1.

The manifold has an upstream face plate 32 and a top face plate 38 as shown in FIGS. 2 and 6. Two end face plates 21A and 21B are connected to the upstream face plate 32 and top face plate 38 (FIG. 1). A downstream face 33 faces the roller 16 and is open to the roller 16 along at least a part of its length. In a presently used embodiment, the entire face 33 is open such that the upstream side of the roller 16 forms a surface that closes the face 33. Thus, as best illustrated in FIG. 6, chamber portion 10 with cavity or chamber 22 is formed between the upstream face plate 32, the top face plate 38, the surface of the belt 30 and the outer, upstream surface of the roller 16. In an exemplary embodiment, the length "l" of the chamber 10 corresponds substantially to the length of the roller 16, which is about 42 inches. The height "h" of the cavity is 3 inches and the width "W" of the cavity is about 3.5 inches.

FIG. 6 is a cross sectional view of the interior of the manifold of FIG. 1. In a presently used embodiment, the chamber 10 is manufactured of stainless steel. The roller 16 in a presently used embodiment has two parts—a stainless steel cylinder 17 and, surrounding the cylinder, a polypropylene sleeve 18 that is shrunk onto the cylinder. This roller 16 is mounted on a rotatable shaft 25 and may be driven by a drive mechanism 20 that is independent of the mechanism driving the casting belt 12. Alternatively, the roller 16 can be driven by the same drive mechanism as drives the casting belt 12 or may be freely rotatable without the aid of a drive mechanism.

At least one inlet 24 is positioned along the length of this top face plate 38. Preferably a plurality of these inlets are positioned along the length of the top face plate 38, as seen in FIGS. 1–6. In the exemplary embodiment, the diameter "$d_i$" of each inlet is about 1.5 inches and three inlets, 24A, 24B and 24C are provided. The inlets may be made of stainless steel and may be attached to the manifold by welding.

As discussed above, the manifold 11 has a hollow chamber 22 in the chamber portion 10. The inlets 24 open into the interior chamber 22. In a presently used embodiment, an adjustable valve 46 is connected to each inlet 24. As shown in FIG. 7, these valves 46 distribute the material 15 evenly into the interior of the manifold chamber 22. The valves 46 are made of stainless steel and can be attached to the piping 45 that pumps material through the manifold chamber 10.

The bottom face 31 of the manifold 11 is open to the casting belt 12 along at least a part of its length. The distance or gap 36 between the bottom face 31 of the manifold and the casting belt 12 can be adjusted using standard shims (not shown). These shims sit on casting belt 12 just under the manifold 11 and create a space 36 between the manifold 11 and belt 12. A sheet of material 15 having uniform dimensions of width and thickness is distributed onto the belt 12 downstream of chamber 10 and roller 16. The thickness of the material 15 thus formed will have dimensions corresponding approximately to that of the fixed distance 36 between the casting belt and the bottom face 31. The width of the material thus formed will have dimensions corresponding approximately to that of the length "l" of manifold chamber 10.

Although the thickness of the material 15 will have dimensions approximately corresponding to the space 36 created by the placement of the shims, the thickness of the final product is actually determined by the amount of pressure going through the manifold. For example, for a thickness of ¼ inch, the space 36 created by the shims would be less than ¼ and the pressure building in the manifold causes the product to pool up or bubble up as it comes out of the gap between the belt and the manifold. When the correct pressure is applied, the product will pool up or bubble up to the desired thickness.

In a standard casting machine, a prior art manifold would be mounted on the infeed end. The prior art manifold of U.S. Pat. No. 4,790,242, for example, is mounted in a position of approximately 45 degrees around the radius of the upper drum at the idler end. The stainless steel belt is in its most stable position at this point and gives the best opportunity for thickness or weight control of the product as it is formed and discharged from the manifold. This process is called "casting on the drum" and the manifold of the present invention may also be mounted in such a manner.

The manifold of the present invention may also be mounted in such a manner that the manifold is upstream from the driven end drum of a standard casting machine, and therefore downstream of the idler drum. In this process, called "casting on the belt" casting occurs on a flat horizontal surface of the belt 12 upstream from the driven end drum of a standard casting machine. The manifold of the present invention may be mounted in such a manner.

Furthermore, the manifold of the present invention may be mounted on a double belt system or on a single belt system.

The hot melted cheese is discharged upon the cooled surface of the upper belt 12 in a continuous sheet 15 evenly distributed across the width of the belt 12. The underside of the sheet of cheese 15 may be cooled by the belt while the belt is moving towards a driven drum at the far end of the belt.

One arrangement for forming a continuous sheet of a viscous material, such as cheese, would use the manifold of the present invention in conjunction with a conventional casting line, such as the Natec Chill Roll or the Hart Casting Line, both of which are commercially available. Such casting lines comprise one or more endless belts, a series of rollers and often a cooling agent which accelerates the cooling of the material as it advances upon the belt or belts. Molten material, such as cheese, is extruded through the manifold of the present invention directly onto the advancing belt of the casting line. The roller manifold 11 of the present invention controls the consistency of the material so that it is spread upon the advancing belt in a continuous sheet. This sheet will cool upon the advancing belt. It can then be carried further downstream by the belt for additional processing.

The casting line may comprise any conventional casting line such as those described above. The structure and function of such apparatus are well known to those skilled in the art and no attempt is made here to describe such apparatus in exhaustive detail. Briefly, the casting line comprises an endless belt that revolves about one set of rollers, and a second endless belt that revolves around another set of rollers. A suitable material for the casting belt 12 is stainless steel. For example, as presently used, the casting belt receives the cheese at temperatures ranging from 100–150° F. to 200–250° F. and advances the continuous sheet at from 5–15 ft/min to about 50–70 ft/min and delivers the sheet for further processing at temperatures from about 30–45° F. to 55–70° F. Material with a temperature up to 400° F. might safely be processed without sticking to the coated surface of the roller of the manifold of the present invention. Other speeds and delivery temperatures are possible.

Another embodiment of the casting machine comprises pans installed at the undersides of the belts that are used to flood the bottom sides of the belts with a cooling medium.

As can be seen in FIG. 6, the roller 16 of the illustrated embodiment has two parts—a stainless steel cylinder 17 and, surrounding the cylinder, a plastic sleeve 18 that is shrunk onto the cylinder.

The belt's rotation begins to draw the material downstream. Preferably, the roller 16 will freely rotate in conjunction with the belt's movement even without its own drive mechanism. However, the material 15 is not distributed as consistently and may not be distributed as continuously; therefore, it is preferred that the roller 16 has its own drive mechanism independent of the drive mechanism of the belt 12. Both belt 12 and roller 16 run at the same surface speed and revolve in the same direction. The speed at which belt and roller are run is dependent on the speed of the casting line, but may be, for example, 5–15 ft/min to about 50–70 ft/min.

The fixed distance 36 between the roller 16 and casting belt 12 therefore determines final sheet thickness. Generally, the thickness of the final sheet varies between 0.09 to 0.13 inches although sheets with a thickness of 0.25 inches can be produced. The desired thickness is determined by the weight and slice dimensions of the desired product that will eventually be cut from the sheets formed by the process of the present invention. As discussed above, the thickness of the sheet is controlled by adjusting the distance 36 between the outer surface of the roller 16 and the surface of the belt 12.

The starting material is pumped into the chamber interior through the inlets 24. These inlets 24 are positioned evenly along the length of the manifold chamber 10. The number of inlets generally depends on the length of the manifold, with longer manifolds having more inlets. The material enters the manifold through the one or more inlets 24 in a steady stream. The interior cavity 10 begins to fill with material. As the interior cavity 10 fills, enough pressure builds in the manifold 11 that the material is extruded onto the belt, forming a contact sheet with the casting belt 12.

The roller 16 functions to flatten this contact sheet 15 out. Preferably, the sleeve 18 is made of a non-stick material, such as polypropylene. Thus, the surface of the roller 16 does not stick to the material being extruded underneath it and even distribution of material in a continuous sheet 15 is facilitated.

Each inlet 24 may have a corresponding adjustable valve 46 to control the flow and thus the distribution of the material 15 onto the casting belt 12. These valves 46 can be clamped in with the piping that is attached to the inlets 24. Although the material 15 may be pumped directly through the manifold 11 without the valves 46, these valves 46 provide additional control of flow into the manifold 11 and thus additional control over the distribution of material onto the casting belt 12.

The rate at which material flows through the manifold of the present invention varies for example from ranges of 50–500 pounds per hour to ranges of 6000–8000 pounds per hour.

The invention permits the even distribution of particularly viscous and sticky material on a surface without tearing the material. The thickness of the produced sheet of material is also maintained precisely by the methods and apparatus of the present invention.

The present invention minimizes the clogging of the manifold apparatus because the more viscous material 15 is less restricted from the inlets 24A–24C at the point of extrusion between the roller and belt. The manifold of the present invention has been shown to run at pressures of as low as 1–10 psi to pressures as high as 100–110 psi. Too much pressure causes the cheese to puddle on the upstream side of the manifold. The attached roller slightly eases the pressure of the material being pumped through the manifold.

The amount of pressure pumped through the manifold affects the occurrence of streaking in the cheese embodiment. A certain amount of pressure must always be pumped through the manifold. In the cheese embodiment, should pressure become too low, streaking will occur. Streaking occurs when particles of cheese stick to the manifold and cause streaks on the ribbons of cheese being extruded from the manifold.

The pressure is set using the pump 42 as described above and further controlled using the valves as described above. The speed of the pump is adjusted depending on the viscosity of the cheese.

A further advantage of the present invention is that it can be used interchangeably in conjunction with the standard/prior art manifold. The method and apparatus of the current invention allow switching between the manifold of the current invention and a standard manifold so that more than one variety of starting material can be processed. Products run through a roller manifold would normally be viscous and would tear and clog if run under a standard manifold nose bar. Products run through a standard manifold would normally be less viscous and would stick to the roller of a roller manifold. Therefore, the apparatus of the present invention is configured such that a standard manifold can be easily mounted and attached to the sheet forming apparatus when needed and a standard manifold can replace the roller manifold when necessary.

For example, in the preparation of cheese, all ingredients are gathered and the final cheese product can be determined. Depending on the product chosen, a standard manifold or the manifold of the present invention is chosen and mounted above the casting belt.

The apparatus of the present invention can be incorporated in a variety of embodiments, only certain of which have been fully illustrated and described above. The invention may be embodied in other forms without departing from its spirit or essential characteristics. The described embodiments are to be considered in all respects as illustrative and restrictive. Therefore, the scope of the invention is best described by the claims that follow rather than by the foregoing description.

What is claimed is:

1. An apparatus for forming a continuous sheet of molten, viscous material onto a casting surface, said apparatus comprising:
   a discharge manifold configured to discharge molten, viscous material having a hollow interior chamber with at least one open side;
   at least one manifold inlet opening into said chamber for receiving the molten, viscous material, each at least one manifold inlet opening configured for attachment to piping;
   a discharge opening on at least one side configured to discharge said molten viscous material from said chamber; and
   a roller rotatably mounted adjacent to the chamber wherein a gap is defined between an outer surface of the roller and the casting surface,
   wherein the roller is configured to discharge a continuous sheet of molten, viscous material and to cooperate with the casting surface to extrude the material received in said gap from said discharge opening.

2. The apparatus of claim 1, wherein at least one manifold inlet is configured for attachment to an adjustable valve for regulating flow of said molten, viscous material upstream of the manifold.

3. The apparatus of claim 2, wherein at least one manifold inlet is attached to an adjustable valve.

4. The apparatus of claim 3, wherein each manifold inlet is attached to an adjustable valve.

5. The apparatus of claim 1, wherein at least one manifold inlet is attached to a pipe.

6. The apparatus of claim 2, wherein each manifold inlet is attached to a pipe.

7. The apparatus as claimed in claim 1, wherein a casting belt mounted adjacent to the discharge manifold and downstream of the roller comprises the casting surface, and wherein the roller is set a fixed distance from the casting belt and the gap is defined between a surface of the roller and the casting surface of the casting belt.

8. The apparatus of claim 1, wherein the roller comprises a stainless steel cylinder and a plastic sleeve shrunk onto the cylinder.

9. The apparatus of claim 1, further comprising a drive mechanism connected to the roller to facilitate rotation of the roller.

10. The apparatus of claim 1, further comprising a pump to facilitate transfer of said molten, viscous material toward the casting belt.

11. The apparatus of claim 1, wherein the manifold has a plurality of manifold inlets.

12. The apparatus of claim 11, wherein each of the manifold inlets is attached to an adjustable valve.

13. The apparatus of claim 7, wherein the roller is positioned such that a longitudinal axis of the roller is perpendicular to a longitudinal axis of the casting belt.

14. The apparatus of claim 7, wherein a bottom face of the chamber is open to the casting belt along at least a part of the length of the bottom face.

15. The apparatus of claim 7, wherein the fixed distance from the roller to the casting belt can determine the final sheet thickness of the molten, viscous material.

16. The apparatus of claim 7, comprising a drive mechanism connected to the casting belt to cause the belt to revolve.

17. The apparatus of claim 7, wherein tandem movement of the roller and the casting belt draws the molten, viscous material from the manifold.

18. The apparatus of claim 7, wherein the discharge manifold is removable so that more than one type of discharge manifold may be interchangeably mounted adjacent to the casting belt.

19. The apparatus of claim 1, wherein the casting surface moves in the same direction as the surface of the roller.

20. The apparatus of claim 19, wherein the roller and the casting surface run at the same surface speed.

21. The apparatus of claim 19, wherein the roller and casting surface are independently driven.

22. The apparatus of claim 1, wherein a fixed distance from the roller to the casting surface can determine the final sheet thickness of the molten, viscous material.

* * * * *